(12) United States Patent
Serebrin et al.

(10) Patent No.: US 11,928,496 B2
(45) Date of Patent: Mar. 12, 2024

(54) SYSTEM FOR LIVE MIGRATION OF VIRTUAL MACHINES WITH ASSIGNED PERIPHERAL DEVICES

(71) Applicant: Google LLC, Mountain View, CA (US)

(72) Inventors: Benjamin Charles Serebrin, Sunnyvale, CA (US); Grigory Makarevich, Bothell, WA (US); Eric Northup, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/130,652

(22) Filed: Apr. 4, 2023

(65) Prior Publication Data

US 2023/0297407 A1  Sep. 21, 2023

Related U.S. Application Data

(63) Continuation of application No. 17/831,068, filed on Jun. 2, 2022, now Pat. No. 11,635,984, which is a continuation of application No. 16/325,132, filed as application No. PCT/US2018/018164 on Feb. 14, 2018, now Pat. No. 11,360,794.

(51) Int. Cl.
*G06F 9/44* (2018.01)
*G06F 9/455* (2018.01)
*G06F 12/1009* (2016.01)

(52) U.S. Cl.
CPC ...... *G06F 9/45558* (2013.01); *G06F 12/1009* (2013.01); *G06F 2009/4557* (2013.01); *G06F 2009/45583* (2013.01)

(58) Field of Classification Search
CPC .................................................. G06F 9/45558

USPC ............................................................ 718/1
See application file for complete search history.

(56) References Cited

U.S. PATENT DOCUMENTS

| 9,189,261 | B2  |   | 11/2015 | Masood |
| 9,223,737 | B1  | * | 12/2015 | Serebrin ............... G06F 13/404 |
| 2004/0064601 | A1 |   | 4/2004  | Swanberg |
| 2005/0108496 | A1 |   | 5/2005  | Elnozahy et al. |
| 2009/0119663 | A1 |   | 5/2009  | Mukherjee et al. |
| 2012/0137292 | A1 | * | 5/2012  | Iwamatsu ........... G06F 9/45558 |
|  |  |  |  | 718/1 |
| 2015/0026384 | A1 |   | 1/2015  | Maitra |
| 2015/0212846 | A1 |   | 7/2015  | Tsirkin |
| 2017/0068634 | A1 | * | 3/2017  | Williamson ........ G06F 13/4081 |

(Continued)

FOREIGN PATENT DOCUMENTS

CN   105335223 A   2/2016
CN   107015844 A   8/2017

OTHER PUBLICATIONS

Kristiansen et al., Device Lending in PCI Express Networks, Dolphin Interconnect Solutions AS, Norway, Apr. 8, 2016, 6 pages.

(Continued)

*Primary Examiner* — Timothy A Mudrick
(74) *Attorney, Agent, or Firm* — Lerner David LLP

(57) ABSTRACT

Hardware transactions or other techniques, such as custom PCIe handling devices, are used to atomically move pages from one host's memory to another host's memory. The hosts are connected by one or two non-transparent bridges (NTBs), which make each host's memory and devices available to the other, while allowing each host to reboot independently.

20 Claims, 17 Drawing Sheets

(56) References Cited

U.S. PATENT DOCUMENTS

2017/0090964 A1    3/2017   Tsirkin
2017/0090968 A1    3/2017   Tsirkin et al.
2018/0336142 A1   11/2018   Pellegrini et al.

OTHER PUBLICATIONS

Kapil et al., Live Virtual Machine Migration Techniques: Survey and Research Challenges, Department of Computer Science and Engineering Graphic Era University, Dehradun, India, Mar. 20, 2013, 7 pages.
International Search Report and Written Opinion for PCT Application No. PCT/US2018/018164, dated Oct. 25, 2018. 14 pages.
International Preliminary Report on Patentability for PCT Application No. PCT/US2018/018164 dated Aug. 27, 2020. 9 pages.
Office Action for European Patent Application No. 18708019.7 dated Sep. 24, 2021. 11 pages.
First Examination Report for Indian Patent Application No. 202047033871 dated Nov. 16, 2021. 6 pages.
Office Action for Chinese Patent Application No. 201880089473.X dated Feb. 3, 2023. 9 pages.
Notice of Allowance for Chinese Patent Application No. 201880089473.X dated Oct. 18, 2023. 4 pages.
Li et al. Research on dynamic migration of virtual machine based on device-agent mechanism. Application Research of Computers, vol. 26, No. 4. Apr. 2009. 4 pages.

\* cited by examiner

| | CPU0 | CPU1 | IOMMU |
|---|---|---|---|
| 1 | Xbegin<br>// Fill the read set -- this is needed only if the VCPUs are still able to access the page<br>for (i = 0; i < 4096; i += CACHELINE_SIZE)<br>Dummy += $START[i]<br><br>$PTE = $END<br><br>Send signal 1 | Wait on signal 1 | TLB may contain $IOVA->$START mapping |
| 2 | Wait on signal 2 | Invalidate IOMMU TLB for $IOVA<br><br>memcpy($END, $START, 4096)<br><br>Send signal 2 | |
| 3 | Xend | | |

SYSTEM FOR LIVE MIGRATION OF VIRTUAL MACHINES WITH ASSIGNED PERIPHERAL DEVICES

CROSS-REFERENCE TO RELATED APPLICATION

The present application is a continuation of U.S. patent application Ser. No. 17/831,068, filed Jun. 2, 2022, which is a continuation of U.S. patent application Ser. No. 16/325,132, filed Feb. 12, 2019, which is a national phase entry under 35 U.S.C. § 371 of International Application No. PCT/US2018/018164, filed Feb. 14, 2018, the entire disclosures of which are incorporated herein by reference.

BACKGROUND

Cloud vendors use live migration to transparently move guests from one host to the other. Doing so relies on an ability to temporarily restrict guest access to regions of memory as guests are being moved from the original host to the new host, for functions like dirty tracking. Similarly, blocking access on the new host allows guests to be restarted during the transfer of the guest memory. If the guest accesses a page of memory that was not moved yet, the guest is paused until the desired page is ready. This pausing relies on a property of central processing units (CPUs) that any page of memory may be marked not-present or not-writeable, and any access is paused while the host performs the appropriate maintenance to make the page available. Then the host restarts the paused access, which resumes cleanly.

However, assigned peripheral devices, such as graphics processing units (GPUs), accelerators, or other peripheral component interconnect express (PCIe) devices, do not have a clean, general purpose method to pause and resume operation. This hinders the ability to live migrate guests that have such peripheral devices assigned.

BRIEF SUMMARY

The present disclosure describes use of hardware transactions or other techniques, such as custom PCIe handling devices, to atomically move pages from one host's memory to another host's memory. The hosts are connected by one or two non-transparent bridges (NTBs), which makes each host's memory and devices available to the other, while allowing each host to reboot independently.

One aspect of the disclosure provides a method of live migration of a guest virtual machine with one or more attached peripheral devices. The method includes coupling a source host to a target host through at least one non-transparent bridge (NTB), identifying a page of memory to be copied from the source host to the target host, the page of memory corresponding to the guest, changing a mapping of the identified page to identify a memory address of the target host, the memory address of the target host being aliased in the source host and not visible to the one or more attached peripheral devices, and copying data for the identified page from the source host to the target host. The method further includes invalidating page table entries of the source host corresponding to the data that was copied, and providing access to the copied pages on the target host to the one or more attached peripheral devices.

According to some examples, changing the mapping for the identified page invokes a first helper thread, and invalidating the page table entries of the source host and copying the data for the identified page invokes a second page table entry (PTE)-editing thread. In some examples, a first signal may be sent from the helper thread to the PTE-editing thread after changing the mapping of the identified page, the first signal indicating a completion of changing the mapping of the identified page, and a second signal may be sent from the PTE-editing thread to the helper thread, the second signal indicating a completion of the copying of the data for the identified page from the source host to the target host. In other examples, predetermined time limits may be implemented for completion of at least one of the changing of the mapping of the identified page, the copying of the data for the identified page, or the invalidating of the page table entries of the source host.

Another aspect of the disclosure provides a system for live migration of a guest virtual machine with one or more attached peripheral devices. The system includes a source host physical machine including one or more memories and one or more processors, the one or more memories supporting the guest virtual machine to be migrated, the host physical machine being coupled to a target host through at least one non-transparent bridge (NTB). The one or more processors of the source host are configured to identify a page of memory to be copied from the source host to the target host, the page of memory corresponding to the guest, change a mapping of the identified page to identify a memory address of the target host, the memory address of the target host being aliased in the source host and not visible to the one or more attached peripheral devices, copy data for the identified page from the source host to the target host, invalidate page table entries of the source host corresponding to the data that was copied, and provide access to the copied pages on the target host to the one or more attached peripheral devices.

In some examples, the NTB may be included in a peripheral component interconnect device, the peripheral component interconnect device being coupled between the source host and the one or more attached peripheral devices. Further, the one or more processors may include one or more processing cores, wherein a first processing core changes the mapping for the identified page and a second processing core invalidates the page table entries of the source host and copies the data for the identified page.

BRIEF DESCRIPTION OF THE DRAWINGS

FIG. 2 is a table indicating operations performed by threads in a computing system according to aspects of the disclosure.

DETAILED DESCRIPTION

A guest running on a virtual machine having one or more attached peripheral devices is moved from a range of memory in Host A to a range of memory in Host B, routing for peripheral device accesses to the guest are adjusted. The move and the routing adjustment are performed atomically, one page at a time, with respect to peripheral device accesses. A peripheral device accessing the guest before the move will use Host A backing memory, and a peripheral device accessing the guest after the move will use Host B backing memory. A peripheral device accessing an in-transit page of the guest during the move must obey the atomic nature of the move, so the access may be delayed, or the move may be aborted and later retried. For example, device reads may be allowed to Host A's copy of a page of memory during the move, but device writes are stopped or abort the move. During the move, CPU write accesses may similarly be disallowed, for example, by pausing the virtual machine, by removing the page to be accessed from the virtual machines page mapping, or by using a variety of other techniques, such as those described below. The atomic move iterates from page 0 to page N of the guest, and moves each page from Host A to Host B. However, other optimizations are possible.

A number of examples for migrating the guest having attached peripheral devices are described below. These examples include atomically moving pages from host to host using transactional memory, using a PCIe interposer device, using a PCIe on-the-side device, using IOMMU modifications, or stunning a PCIe device. While the examples below refer to a granularity of 4 KB for input/output memory management unit (IOMMU) and PCIe routings, it should be understood that larger granularity can be used, for example, for better batching. Similarly, it should be understood that smaller batching may be used, for example, in systems with smaller page mapping granularity.

Figure 1A:
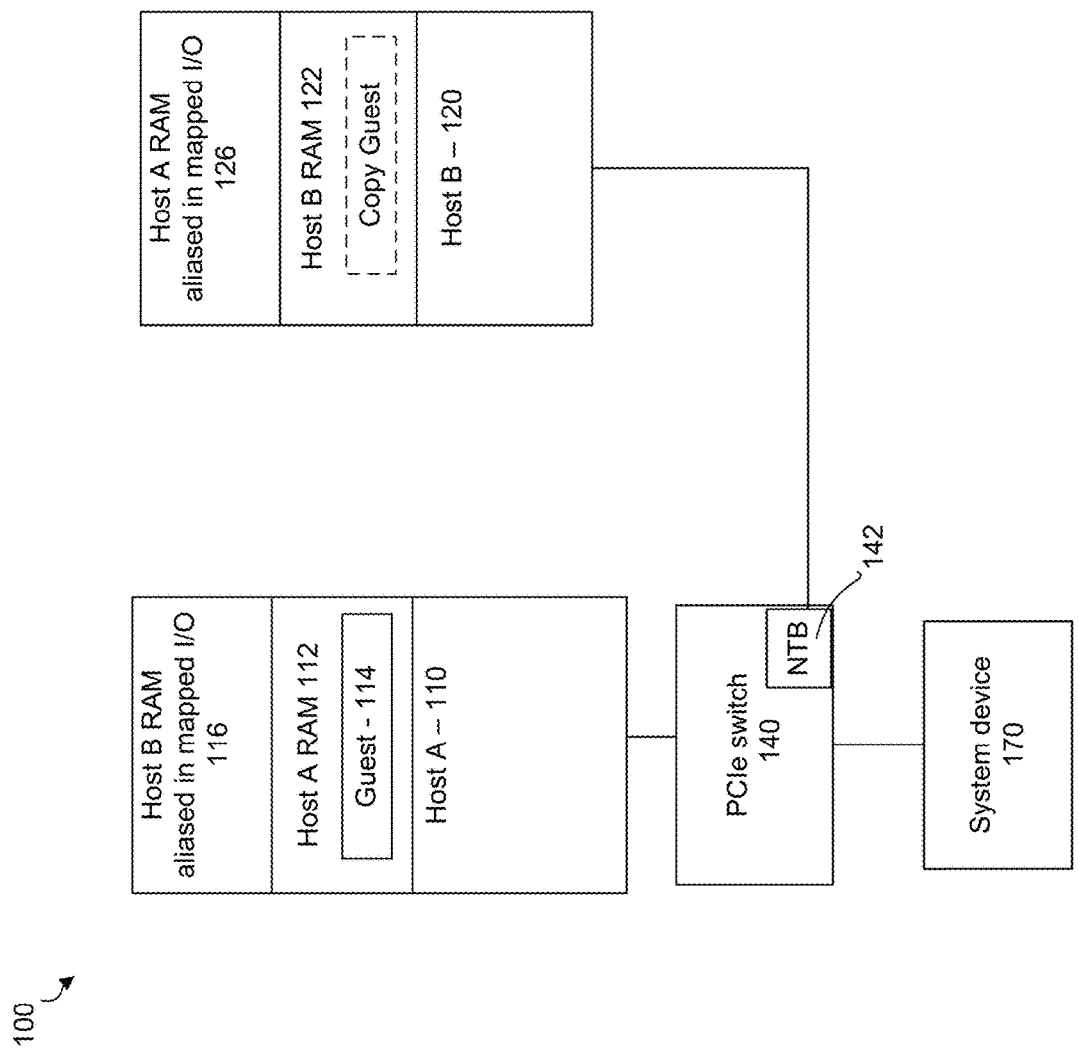
FIG. 1A is a schematic diagram of an example computer system coupling a first host device to a second host device using at least one non-transparent bridge (NTB) according to aspects of the disclosure.

FIG. 1A illustrates a system 100, including a first host 110 (Host A) and a second host 120 (Host B). The system 100 has been described above as a system may include any configuration of a number of electronically coupled computing devices. For example, the computing devices may be arranged on a motherboard, on a backplane interconnecting peripherals, on an expansion card interface, or the like. The connection between the computing devices may be hard-wired connections, wireless connections, or any other type of connections. For example, the system 100 may include TCP/IP, 802.11, Ethernet, InfiniBand, or any other type of network.

Each host 110, 120 includes a memory 112, 122, respectively, such as a random access memory (RAM), dynamic RAM (DRAM), non-volatile dual in-line memory module (NVDIMM), etc. In this example, guest 114 will be migrated from a block of memory in Host A 110 to a block of memory in Host B 120. Each host 110, 120 may further include other components typically present in host computing devices, such as input/output memory management units (IOMMUs), etc.

Host A 110 is coupled to PCIe switch 140. The PCIe switch 140 is a high speed interconnect providing for interconnection of one or more system devices 170 to other components in the system 100. The PCIe switch 140 may be a motherboard-level interconnect, an expansion card interface, Advanced Extensible Interface (AXI) bus, or any other type of interconnect. The system devices 170 may communicate through the PCIe switch 140 over one or more links.

The system device 170 may be any type of PCIe devices capable of communicating over the system 100. By way of example only, the system device 170 may be a GPU, network interface controller (NIC), or any other PCIe compliant device. Although only one system device 170 is shown, the system 100 may include any number of system devices. In some examples herein, the system device may also be referred to as a PCIe device, or simply a device.

In this example, the PCIe switch 140 also includes a non-transparent bridge (NTB) 142. The NTB 142 may be used to connect two or more devices and allow the two or more Hosts to share resources in a way that makes it seem each host's hierarchy has apertures into the other host's hierarchy. For example, the NTB 142 is used to connect the Host A 110 to the Host B 120 through the PCIe switch 140. In this regard, the system device 170 is visible to both the Host A 110 and the Host B 120. The NTB 142 also makes the memory 112, or a subset of the memory, of Host A 110 visible to Host B 120, and the memory 122, or a subset of the memory, of Host B 120 visible to Host A 110. For example, as illustrated in FIG. 1A, Host B's memory is aliased in mapped input/output space 116, such as a memory mapped input/output (MMIO), of Host A. Similarly, Host A's memory is aliased in mapped input/output space 126 of Host B.

According to a first example, migrating the guest 114 from Host A 110 to Host B 120 includes using transactional memory A first helper thread invalidates the IOMMU TLB and copies a 4 KB page from Host A 110 to Host B 120, while a second page table entry (PTE)-editing thread edits Host A's IOMMU page table entry inside a hardware transaction. The PTE originally maps the Host A PCIe address to Host A memory 112. After the edit, the PTE maps Host A PCIe address to Host B memory 126, in an address space 126 made available by the NTB 142. After all the moves occur, PCIe and NTB level mappings will be adjusted to redirect all device access directly to Host B, avoiding the Host A IOMMU and NTB mapping steps.

Read or write access to the IOMMU page table entry will abort the PTE-editing thread during the transaction, leaving the page table entry at its old value. The helper thread's work is idempotent; since no access will be made to the Host B copy of the page until the PTE edit is committed, any abort action will result in wasted but a harmless copy and IOMMU TLB invalidation by the helper thread. A retry will re-do the helper thread's work.

Figure 1B:
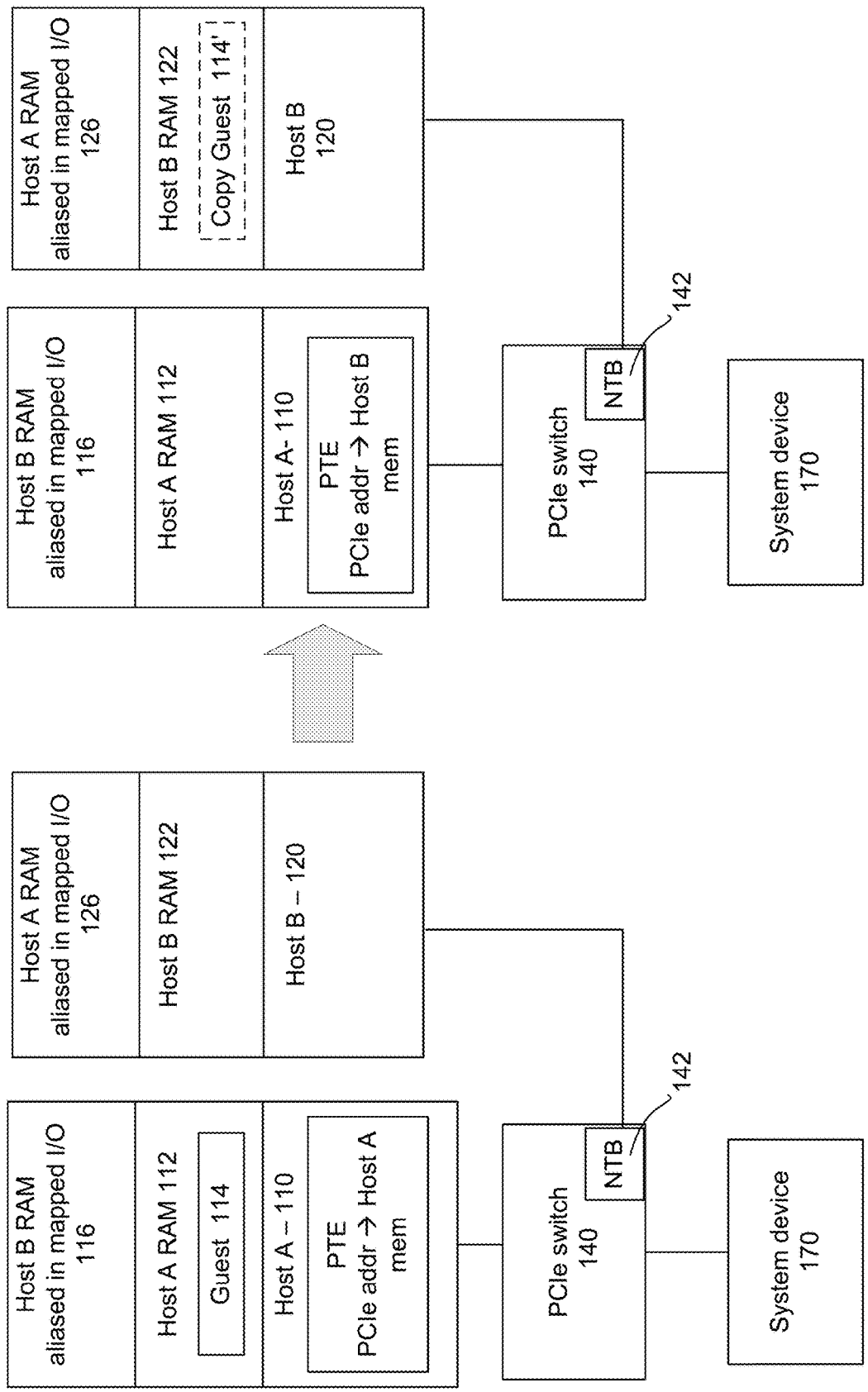
FIG. 1B illustrates an example of migrating a guest using the example computer system of FIG. 1A.

FIG. 1B illustrates an example of migrating guest 114 from Host A 110 to Host B 120. As shown, a page table entry in Host A 110 initially maps an address of the PCIe device (e.g., system device 170) to a memory location in Host A memory 112. As pages are copied, the page table entries for the copied pages will be updated to point to Host B RAM in address space 116. Once copying is complete, the guest 114 has been moved to Host B RAM 122, and is shown as copy guest 114'. Moreover, the page table entry in Host A for the system device 170 maps to Host B memory 122.

FIG. 2 provides a table 200 illustrating a sequence of operations in moving the guest from Host A 110 to Host B 120. Operations of a first CPU0, for example in Host A, may be operations of the PTE-editing thread. Operations of a second CPU1, for example also in Host A, may be operations of the helper thread. In this example, the guest is moved one 4 KB page at a time. The 4 KB page has multiple aliases. For example $START is a Host A 110 RAM address, and $START_B is a RAM address in Host B 120 that aliases to the same page. $END is a Host A MMIO alias of the Host B physical RAM page $END_B.

In a first phase, at row 1 of the table 200, Xbegin indicates a start of a transaction. In some examples, an entire 4 KB page is put into a read set, including all data items that are read or loaded during a transaction. Optionally, each cacheline of the 4 KB page is read, so as to track accesses to the cachelines in the read-set of the hardware transaction. This is optional because it is used to abort upon writes to the page. If there were a device write, it would cause the transaction to be aborted in the first phase or the second phase, because the IOMMU must access the page table entry ($PTE). PTE is in the write-set, so reads and writes from outside cause aborts. By putting the cachelines in the read set, VCPUs or hypervisors attempting write accesses to the page being moved can be caught. In other examples, traditional page not-present mechanisms may be used to catch VPCU writes at various performance/complexity tradeoffs.

The operations associated with the start of the transaction are not visible outside of CPU0. $PTE=$END causes a change in mapping structure. For example, as shown in the IOMMU column of row 1, a translation lookaside buffer (TLB) or other cache of page table translation may contain an input/output virtual address (IOVA). $IOVA, as shown, which may be the PCIe address that the system device 170 uses to communicate with the 4 KB page being moved. In accordance with the change in mapping structure, any device that wants to access memory needs to access an end value, as opposed to an old value. By adding the entire 4 KB page to the read set, the transaction can detect writes to the page. This is redundant with page table accesses for the device, but cached CPU-based accesses, These CPU accesses could result if virtual-CPUs (VCPUs) are allowed to continue running or if host-level helper threads are not kept from writing to the page.

In other examples, rather than copying the entire 4 KB page to the read set, the page table entries are updated with the memory addresses of Host B aliased on Host A MMIO.

When the CPU0 finishes the first step, it sends "signal 1" telling CPU1 that it is finished.

In row 2, once the helper thread sees the signal 1, it proceeds to a second phase. The helper thread tells the IOMMU to invalidate cached pages of the table entries, including but not limited to the IOVA being migrated. This invalidation affects TLBs located in the IOMMU itself as well as any ATS (Address Translation Services)-compliant TLBs located in devices. The IOMMU sends an acknowledgement when it is finished. In function "memcpy" values from Host A are copied to Host B. After memcpy, Host B has an exact copy, but no other devices have access to the exact copy yet. The invalidate and copy operations can be performed in any order. Once this second phase is complete, CPU1 sends "signal 2" to CPU0.

In a third phase, shown in row 3 of the table 200, the transaction is then ended. If the transaction was completed without being aborted, then it is true by construction that no devices read the IOMME PTE during the transaction, and so there exists no stale cached copy of the PTE. Further, no PCIe device or any other CPU wrote the 4 KB page of Host A during the transaction. The copy of the 4 KB page at $END should be identical to the copy at $START at the time of Xend. The "live" copy of the 4 KB page now resides on Host B, and accesses by system devices after Xend will go to the Host B copy. No accesses by system devices will go to the Host A $START copy after Xend. As long as copying of the page from START to END and updating the IOMMU page table both occur without external observation of the page table entry and without external modification of the 4 KB page, the transaction should successfully complete without being aborted.

If the transaction was not successfully completed, it may have been aborted for any of a number of reasons. For example, the transaction may be aborted in the first phase (row 1 of the table 200), if the IOMMU TLB does not have a cached translation and the PCIe device reads or writes to the Host A 4 KB page. This aborts the transaction because the IOMMU page table entry is in the write set and IOMMU hardware reads that value. As another example, the transaction may be aborted in the first phase if IOMMU TLB has cached a translation $IOVA->$START and PCIe device writes to the Host A 4 KB page. While PCIe reads are safe (with respect to the consistency of external observations of the page being migrated) and do not cause the transaction to abort if the PTE=END step has not yet executed, the PCIe writes may not be safe because the page is in the process of being copied and a write to a sub-range of the page may be missed by the copy process. PCIe writes are detected because the 4 KB page is in the read set, and the PCIe device wrote to it. As yet another example, the transaction may be aborted in the first phase if an interrupt comes to CPU0. If the transaction is aborted in the first phase, the CPU0 may throw away read values and discard the IOVA writes as a result. CPU1, however, may still perform the work described in phase 2.

In some examples, the transaction may be aborted in the second phase for the same reasons described above in connection with aborts in the first phase. As a result of aborting the transaction in the second phase, the CPU0 throws away the read values and discards the IOVA write. CPU1 has copied some or all of the 4 KB page to host B, but because the IOVA write is discarded, the host B page was never accessible to the PCIe device. The key synchronization is that the IOMMU TLB invalidation (which waits for acknowledgement that the operation completed) is finished before the memory copy starts; because the transaction is monitoring the page table entry, if the transaction does not abort during step 2, then by construction, there was no read of $IOVA during step 2. Therefore the memcpy read a consistent, unmodified set of data from $START.

Transactions do not allow signals to be emitted while the transaction is not yet committed, making it difficult to emit a progress signal from inside the transaction. Similarly, once a transaction has read a memory location, an external thread cannot change that memory location without aborting the transaction. A pre-arranged time schedule may be used with read timestamp counter (RDTSC) instruction to synchronize the two CPUs and build signal 1 and signal 2. For example, some processors, such as x86 processors, have a multi-GHz clock that is precisely synchronized on all cores. The threads communicate a start time START_TIME and rendezvous times before either begins work or transactions. The interval between steps is pre-determined and may be dynamically adjusted to balance wait times and spurious aborts. In the transaction thread, operation "Send signal 1" is implemented by having the transaction abort if the thread does not complete its work by the time for which "send signal 1" is scheduled. In such example using a pre-arranged time schedule, there is no explicit communication of signal 1 between threads.

In the case where the helper thread signals to the transaction thread, operation "Send signal 2" is implemented by a collection of M booleans, spaced no denser than one per cacheline. The threads pre-arrange a time interval INT (for example, 500 cycles). When the transaction thread waits on the signal, it reads entry N, where N=(RDTSC( )−START)/INT. Thus, for example, if the current time is 1200 cycles after start, then N=1200/500=2. If entry N is true, then signal 2 has been sent. Otherwise, signal 2 has not yet been sent and the thread waits until the next time multiple of INT. Then the thread reads the next boolean at N=3. When the helper thread wishes to Send signal 2, it calculates N=(RDTSC( )−START)/INT and writes true to all booleans indexed from N+1 to M, inclusive. This arrangement lets the transaction read each boolean one time and ensures the helper thread will not write into a boolean that is already in the transaction, which would abort the transaction. The booleans may be a linked list, scattered non-sequentially in memory, to avoid prefetchers bringing booleans into the transaction earlier than intended.

Live migration post-copy is compatible with the transaction based approach to migration described above in connection with FIG. 2. A subset of guest memory, such as known hot memory pages, can be moved from Host A to Host B, and then CPU execution can be transferred to Host B. In post-copy, the guest resumes execution on Host B, and in the background, pages continue to be transferred with the above transaction-based migration method. While a post-copy phase is completing, either Host A's IOMMU or Host B's IOMMU may be active. Subsequent device accesses to guest memory would be translated by Host B's IOMMU. A device access to a page that has been relocated to Host B will directly access Host B's RAM. A page that is still residing on Host A will be redirected by the IOMMU mapping, through the NTB, to the backing location in Host A. VCPU access, on the other hand, would be allowed directly for pages residing in Host B, but pages residing in Host B would cause EPT page faults for VCPU access. When a VCPU has a page fault, the background copy method would be told to prioritize the needed page.

Figure 3:
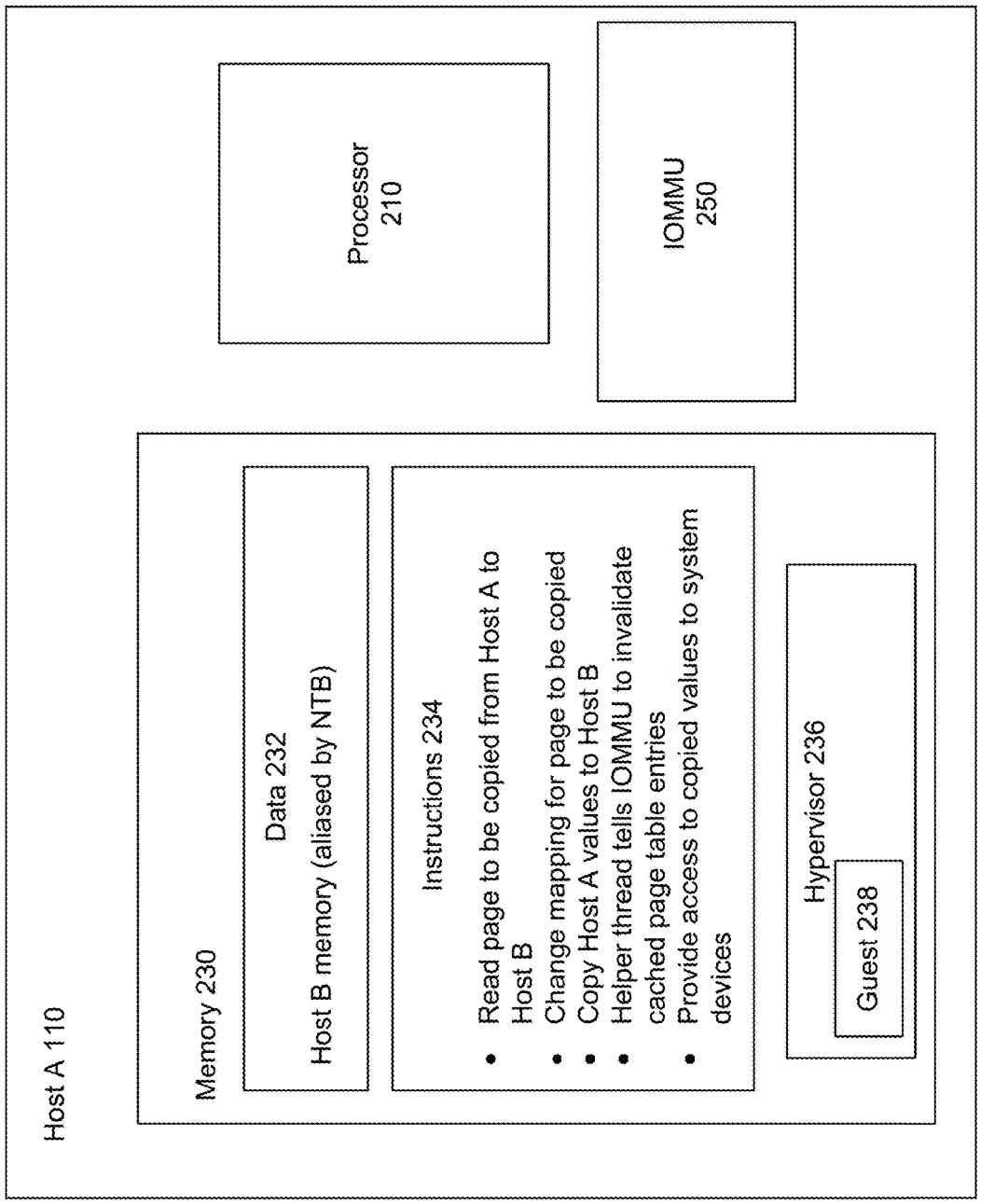
FIG. 3 is a block diagram of an example host device according to aspects of the disclosure.

FIG. 3 depicts an example Host 110. As illustrated, the Host 110 may include one or more processors 210, one or more memories 230, and an IOMMU 250.

The processor 210 may be any well-known processor, such as a commercially available CPU or microcontroller. Alternatively, the processor may be a dedicated controller such as an ASIC. According to some examples, the processor 210 may be a multi-core processor having two or more processing cores.

Memory 230 stores information accessible by processor 210, including instructions 234 that may be executed by the processor 210. The memory also includes data 232 that may be retrieved, manipulated or stored by the processor. The memory 230 may further include a hypervisor 236 running one or more guests 238. The guests 238 may be, for example, virtual machines. While the hypervisor 236 is illustrated as being implemented in memory 230, it should be understood that the hypervisor 236 may be implemented as software, hardware, or firmware, and may map guest memory to the memory 230. The guest 238 may be logically attached to one or more system devices (not shown), such as PCIe or other peripheral devices. Examples of such system devices include GPUs, network interface cards (NICs), machine learning accelerators (TPUs), FPGAs, video encoders or transcoders, hardware security modules, or other accelerators, hard disks or SSDs, or custom devices.

IOMMU 250 is a memory mapping unit, which may connect direct memory access (DMA)-capable I/O devices to memory 230 and to other devices 170. The IOMMU 250 may map device-visible PCIe virtual addresses (e.g., device addresses or I/O addresses) to physical addresses. In this regard, the IOMMU 250 may include a plurality of page table entries (PTEs), mapping I/O from peripheral devices attached to the guest 238 to the memory 230 or to other devices 170.

The memory 230 may be of any type capable of storing information accessible by the processor, such as a hard-drive, memory card, ROM, RAM, crosspoint RAM, non-volatile RAM, DVD, CD-ROM, write-capable, and read-only memories. The memory 230 includes data 232 that may be retrieved, manipulated or stored by the processor in accordance with the instructions 234. For instance, although the system and method is not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data. In the example shown, the data 232 includes memory of Host B, which is aliased in MMIO of Host A 110 by the NTB through which Host B is coupled to Host A. It should be understood that the data 232 also includes Host A memory.

The instructions 234 may be any set of instructions to be executed directly (such as machine code) or indirectly (such as scripts) by the processor 210. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance.

The instructions 234 may be executed by the processor 210, for example, to provide for migration of the guest 238 from the Host A 110 to a target host, such as the Host B 120 (FIG. 1). For example, the instructions 234 may be executed to read a page to be copied from the guest 238 on Host A 110 to the target host or to instruct a DMA engine to perform a similar copy. At this point, a page table entry in the IOMMU 250 maps PCIe addresses of Host A to Host A RAM. The mapping is changed for the page to be copied, such as by using the $PTE=$END operation described above in connection with the table of FIG. 2. For example, memory of the target host is aliased in mapped I/O of the Host A 110. Accordingly, peripheral devices must access an end value corresponding to the target host memory, as opposed to an old value corresponding to the source host memory. The instructions 234 further cause a helper thread in the one or more processors 210 to tell the IOMMU 250 to invalidate cached page table entries. The IOMMU 250 may acknowledge that all cached page table entries corresponding to the invalidation request have been invalidated. Before, during, or after the IOMMU invalidation of page table entries, values from the guest 238 on source Host A 112 may be copied to the target host. Once copying is complete, the IOMMU 250 maps host A PCIe addresses to RAM of the target host (e.g., Host B), which is aliased in an address space made available by the NTB. Accordingly, access to the guest 238 copied on the target host is provided to system devices. For example, PCIe and NTB level mappings will redirect all peripheral device access directly to the target host, avoiding the IOMMU 250.

Although FIG. 3 functionally illustrates the processor 210, memory 230, and IOMMU 250 as being within the same block, it will be understood that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor 120. Similarly, the processor 120 may actually comprise a collection of processors which may or may not operate in parallel. Further, the IOMMU 250 may reside in a different housing coupled to the Host A 110.

Figure 4:
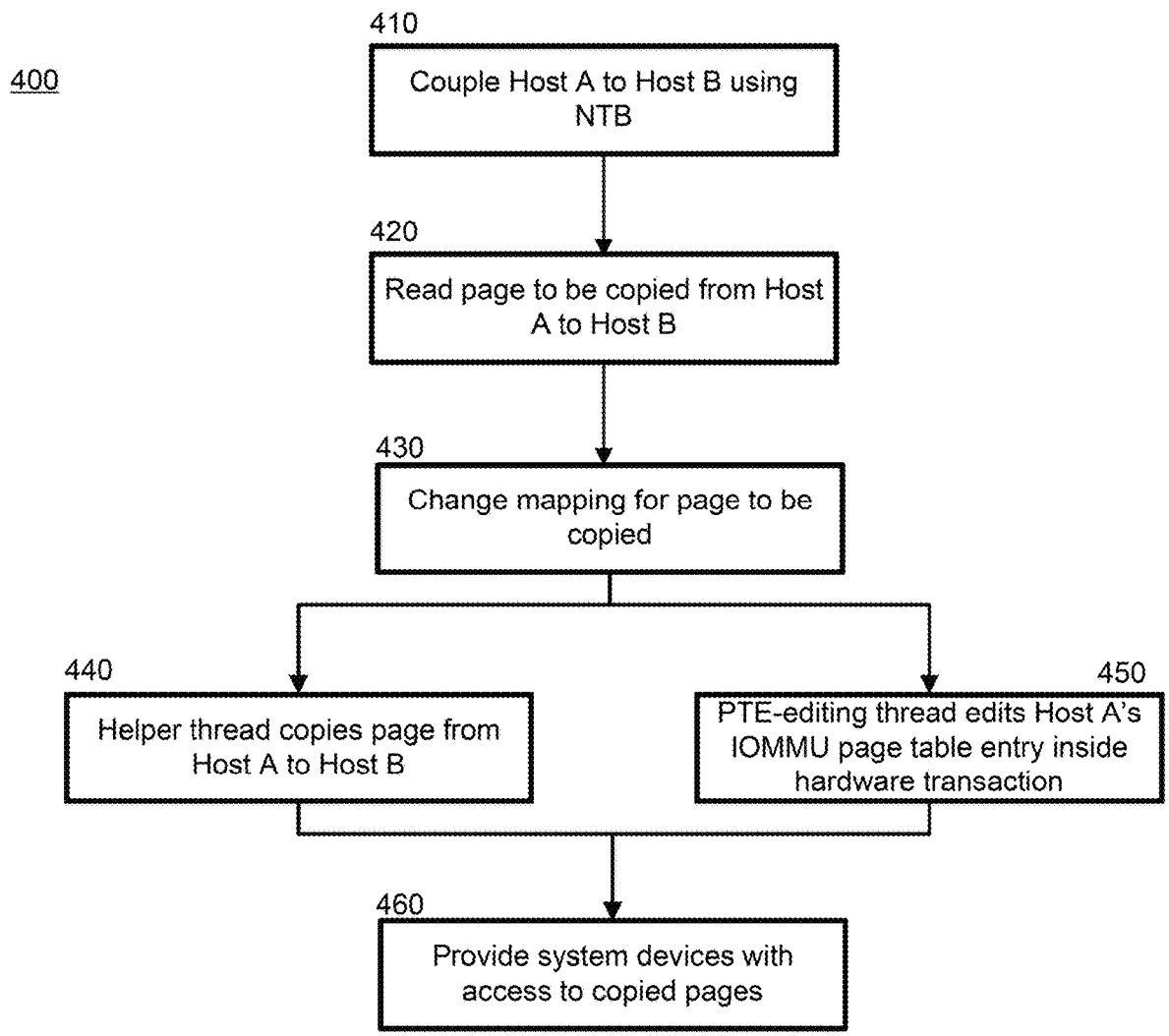
FIG. 4 is a flow diagram of an example method of live migration of a guest having at least one attached peripheral device according to aspects of the disclosure.

FIG. 4 illustrates an example method 400 of atomically moving pages of a guest having attached peripheral devices from a source host to a target host using transactional memory. While the operations are described below in a particular order, it should be understood that the order may be modified or operations may be performed concurrently. Moreover, operations may be added or omitted.

In block 410, source host A is coupled to target host B using one or more NTBs. For example, as shown in FIG. 1, the source host may be coupled to a PCIe switch which includes an NTB. The NTB may be coupled to the target host. The connections between the source host and the target host may be both physical and logical connections. Accordingly, the logical connections may be modified or removed without requiring modification of the physical connections. As a result of the NTB connection, memory of the target host may be aliased in mapped I/O of the source host, and memory of the source host may be aliased in mapped I/O of the target host.

In block 420, a page to be copied from the source to the target is read by CPU0 transaction code. The page may be, for example, a 4 KB page. In other examples, the page may be smaller or larger. It should be understood that the operations of block 420 are optionally performed to catch attempted writes by a VCPU, but can be omitted.

In block 430, the mapping for the page to be copied is changed. For example, rather than accessing an old value corresponding to a memory location on the source host, devices must access an end value corresponding to a memory location of the target host. This may be performed by, for example, a PTE-editing thread of the source host. According to some examples, the PTE-editing thread may signal to another thread when the change in mapping is complete. In other examples, the mapping change may be assumed to be complete after a predetermined period of time.

In block 440, a helper thread tells the IOMMU in the source host to invalidate cached page table entries. The IOMMU may provide acknowledgement, indicating that all cached copies of the page table entries have been discarded In block 450, memory corresponding to the guest is moved from the source host to the target host. The memory may be moved one page at a time. Access by the peripheral devices may be prohibited during copy. Attempts by the peripheral devices to access the memory being copied may result in an abort of the transaction. While blocks 440 and 450 are shown as being performed at generally a same time, it should be understood that alternatively the operations of block 440 may be performed before or after the operations of block 450.

In block 460, access to the guest on the target host is provided to the peripheral devices.

Figure 5A:
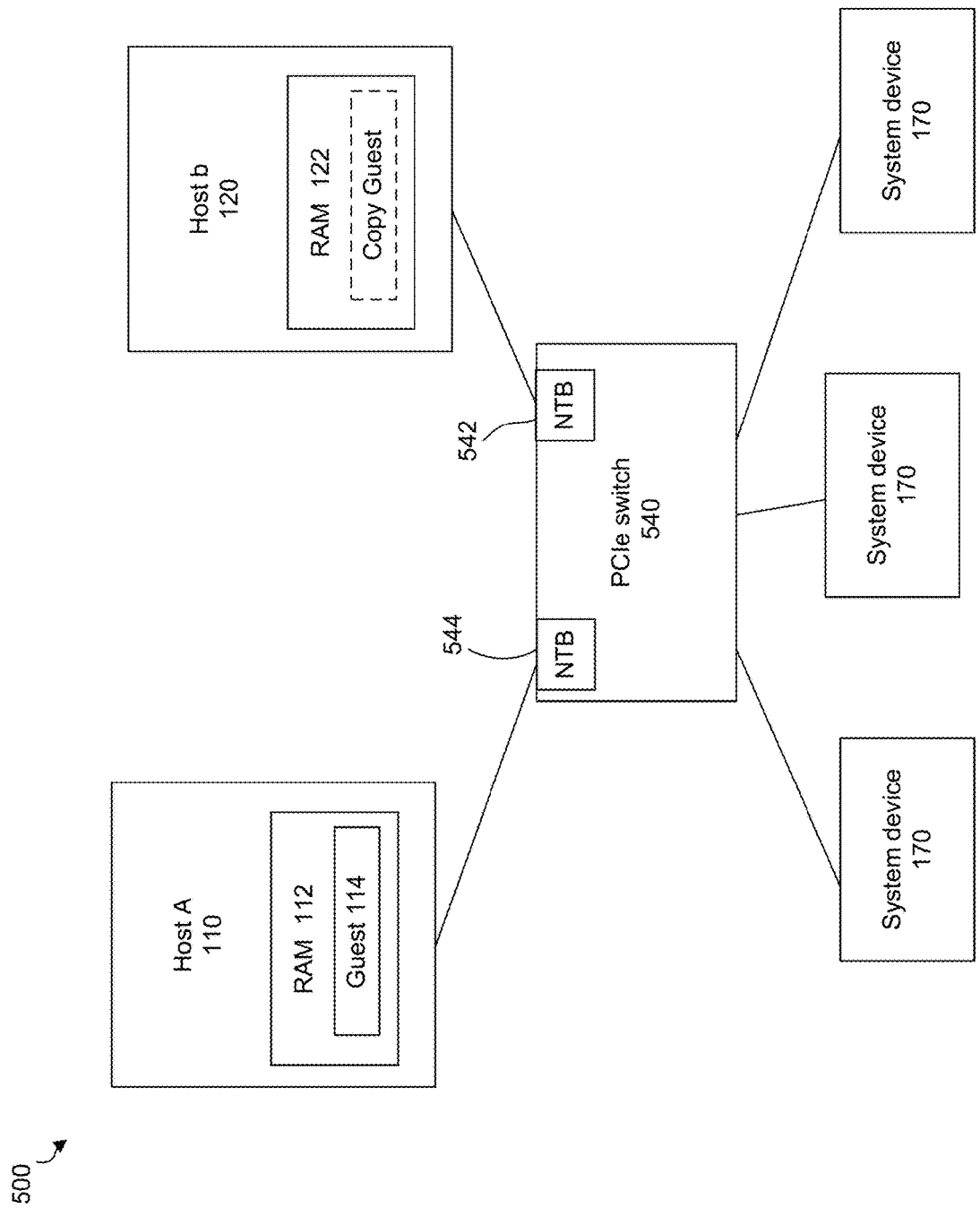
FIG. 5A is a schematic diagram of another example computer system coupling a first host device to a second host device using at least one NTB according to aspects of the disclosure.

While the examples described above utilize a single NTB, as shown in FIG. 1, it should be understood that other examples may utilize multiple NTBs. FIG. 5A, for example, illustrates a system 500 including the Host A 110 and Host B 120, where each are connected to separate NTBs 542, 544 of PCIe switch 540. In this regard, in contrast to using a single NTB, the NTB does not need to move from one host to the other during migration. The NTBs may remain enabled all the time, thereby reducing a complexity of moving the NTB from host A to host B. However, using more NTBs requires more hardware, and thus a greater device cost.

Figure 5B:
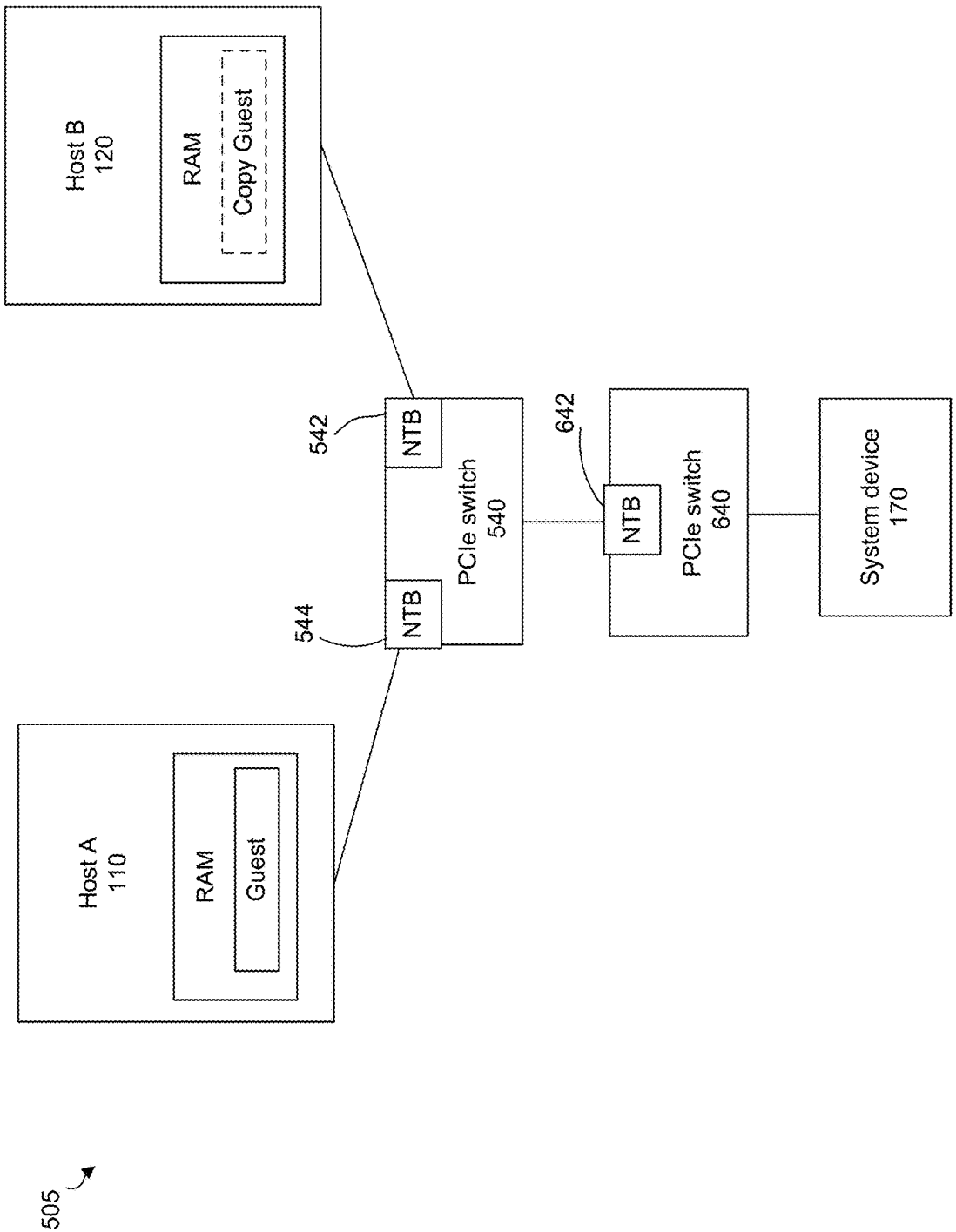
FIG. 5B is a schematic diagram of another example computer system coupling a first host device to a second host device using at least one NTB according to aspects of the disclosure.

FIG. 5B illustrates another example system 505, which is similar to the system 500 but includes a second PCIe switch 640. The second PCIe switch 640 includes another NTB 642, which is used to couple the second PCIe switch 640 to the PCIe switch 540. In this example, the NTB 642 may serve as a single point for performing address mapping changes, as opposed to more complex address mapping adjustments which may be required in PCIe switch 540 of FIG. 5A.

Figure 6:
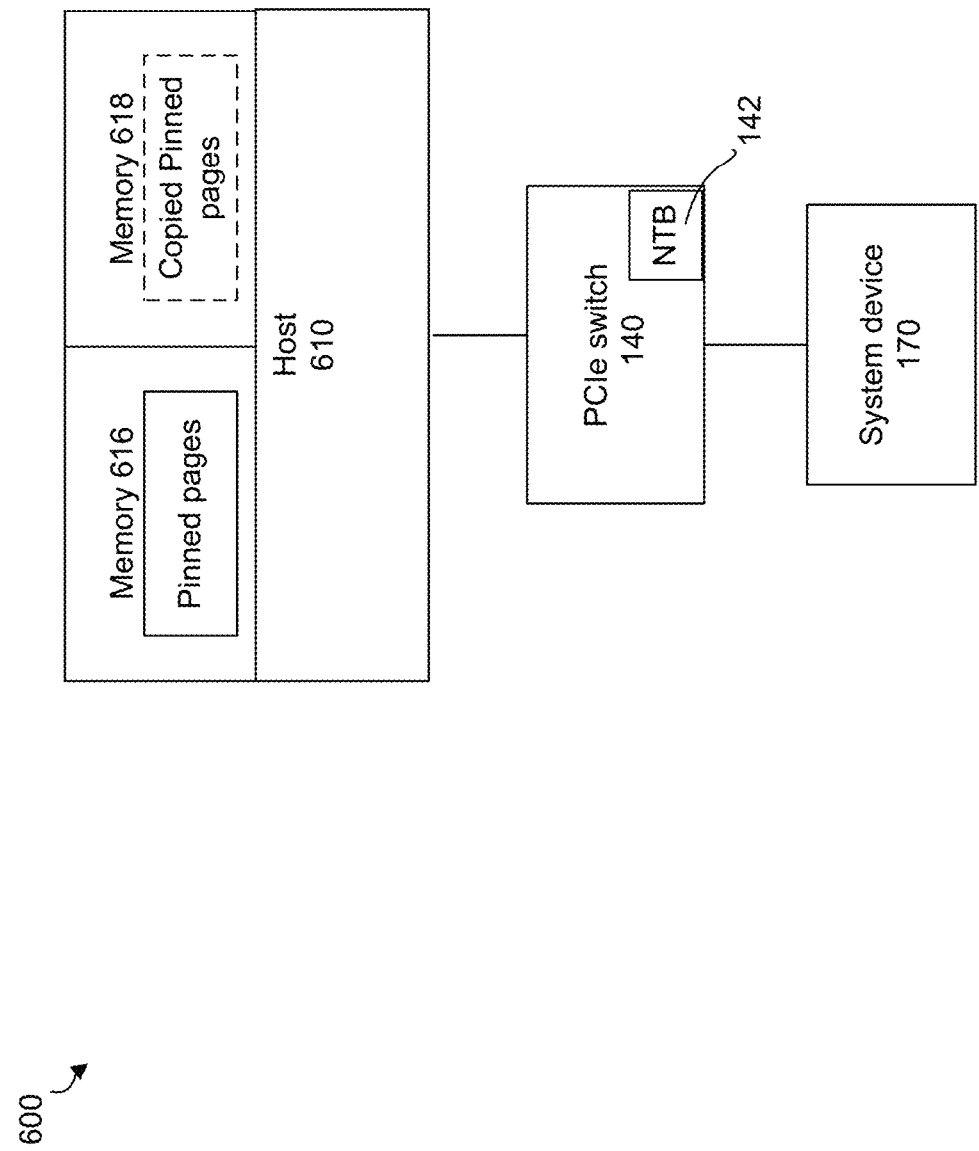
FIG. 6 is a schematic diagram of an example computer system for moving pinned pages within memory locations of a single host device according to aspects of the disclosure.

FIG. 6 illustrates a further example 600, where the transaction-based approach described above may be used to move pinned pages from a first location in memory 616 to a second location in memory 618 of a same Host 610. First memory 616 may be a separate memory from second memory 618. For example, the first memory 6616 and the second memory 618 may be two different types of memory in the same host 610, or two independent memories of the same type. In other examples, the first memory 616 and the second memory 618 may be different portions of the same memory unit. In either case, moving the pinned pages 616 to another memory location may impact functioning of the attached system device 170. Accordingly, as described above with respect to copying a guest, a page table entry mapping the system device 170 to first memory 616 may be updated as the pinned pages are moved to the second memory 618.

Figure 7A:
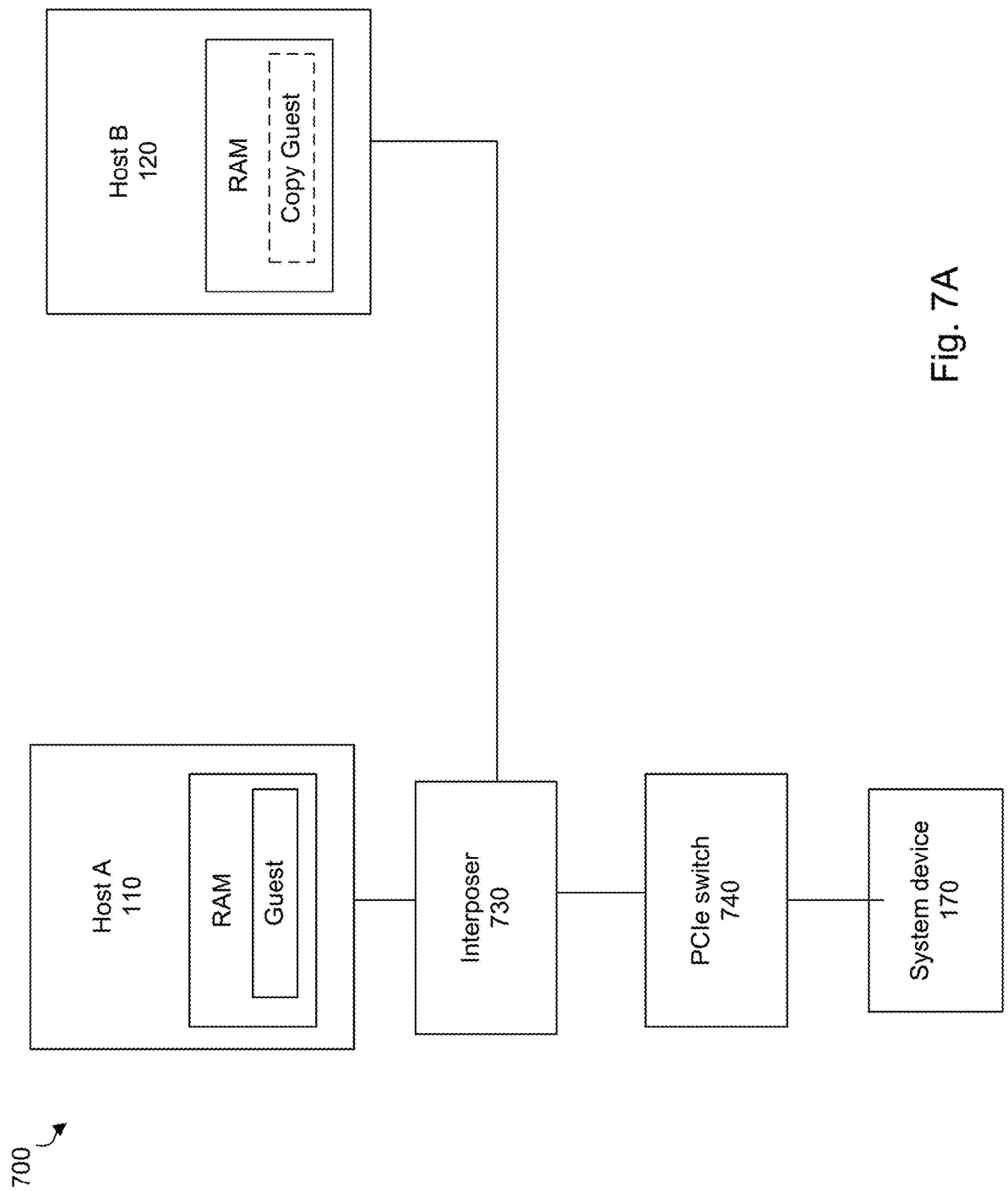
FIG. 7A is a schematic diagram of an example computer system coupling a first host device to a second host device using at least one interposer according to aspects of the disclosure.

Other example systems and methods for migration of a guest having attached peripheral devices from a source host to a target host may not use NTBs at all. FIG. 7A, for example, illustrates a system 700 including an interposer device 730 connected between the Host A 110 and PCIe switch 740, and between the Host B 120 and the PCIe switch 740.

The interposer device 730 may be, for example, an ASIC or field programmable gate array (FPGA) that interposes on a PCIe traffic pattern. The interposer 730 may have, for example, three maximum width (x16) PCIe ports, allowing it to service full line rate PCIe traffic. The interposer 730 can observe and modify every PCIe packet for purposes of dirty tracking, page copy, atomic delay, etc.

The interposer device 730 can read the address and size of every PCIe packet. It can produce dirty tracking at any desired granularity. For example, the device can populate a vector of bits where each bit represents one 4 KB page. The vector can reside in device or in host memory. The interposer device 730 can use atomic compare-and-exchange (cmpxchg) to set bits, or use non-atomic writes with some synchronization with the host. The interposer device 730 could also walk IOMMU page table entries and set dirty bits, or implement its own IOMMU and walk page tables, setting dirty bits.

The interposer device 730 could implement a full move of the guest 114 from the Host A 110 to the Host B 120, for example, by performing the page copy and building atomic behavior. On request from a host, such as the Host A 110, the interposer device 730 can delay or buffer accesses by PCIe devices to a specified page, copy the page from Host A 110 to Host B 120, and then drain the access buffer. The interposer device 730 can service reads from the in-process copy plus differential updates from writes, tracked within the interposer device 730 itself. Alternatively, the interposer device 730 can delay progress on all reads and writes to the page in progress.

The interposer device 730 could implement a subset of the full move implementation, delaying peripheral device access while the host, e.g., Host A 110, performs the copy.

Figure 7B:
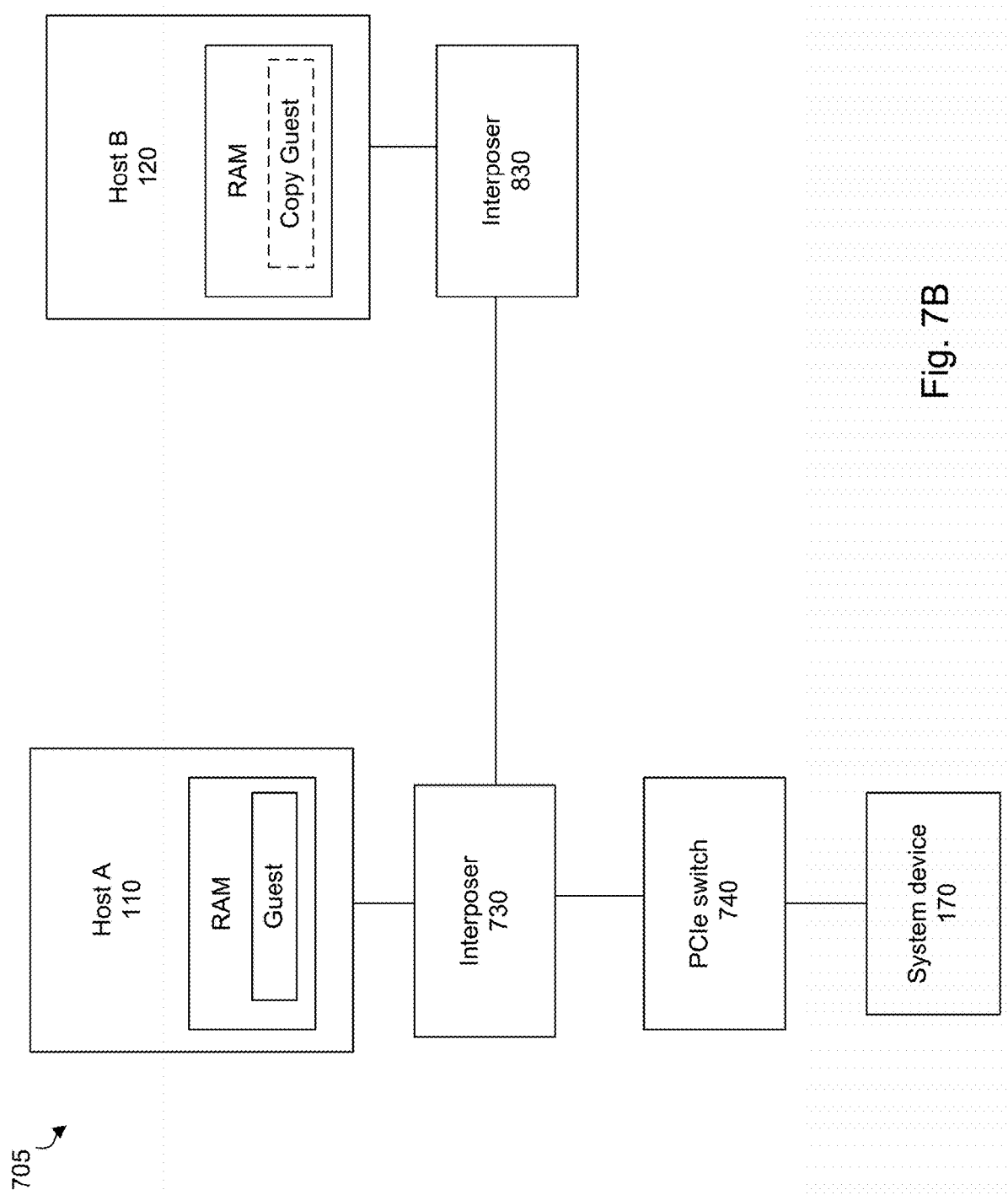
FIG. 7B is a schematic diagram of another example computer system coupling a first host device to a second host device using at least one interposer according to aspects of the disclosure.

While one interposer device 730 is shown in FIG. 7, it should be understood that the number and positioning of the interposer device 730 may be modified. For example, FIG. 7B illustrates another example system 705 which includes a second interposer 830. Accordingly, first interposer 730 is positioned between the Host A 110 and the PCIe switch 740, and the second interposer 830 is positioned between the Host B 120 and the first interposer 730. This system 705 is logically the same as the single interposer in FIG. 7A, but would enable building Host A and Host B identically.

Figure 8:
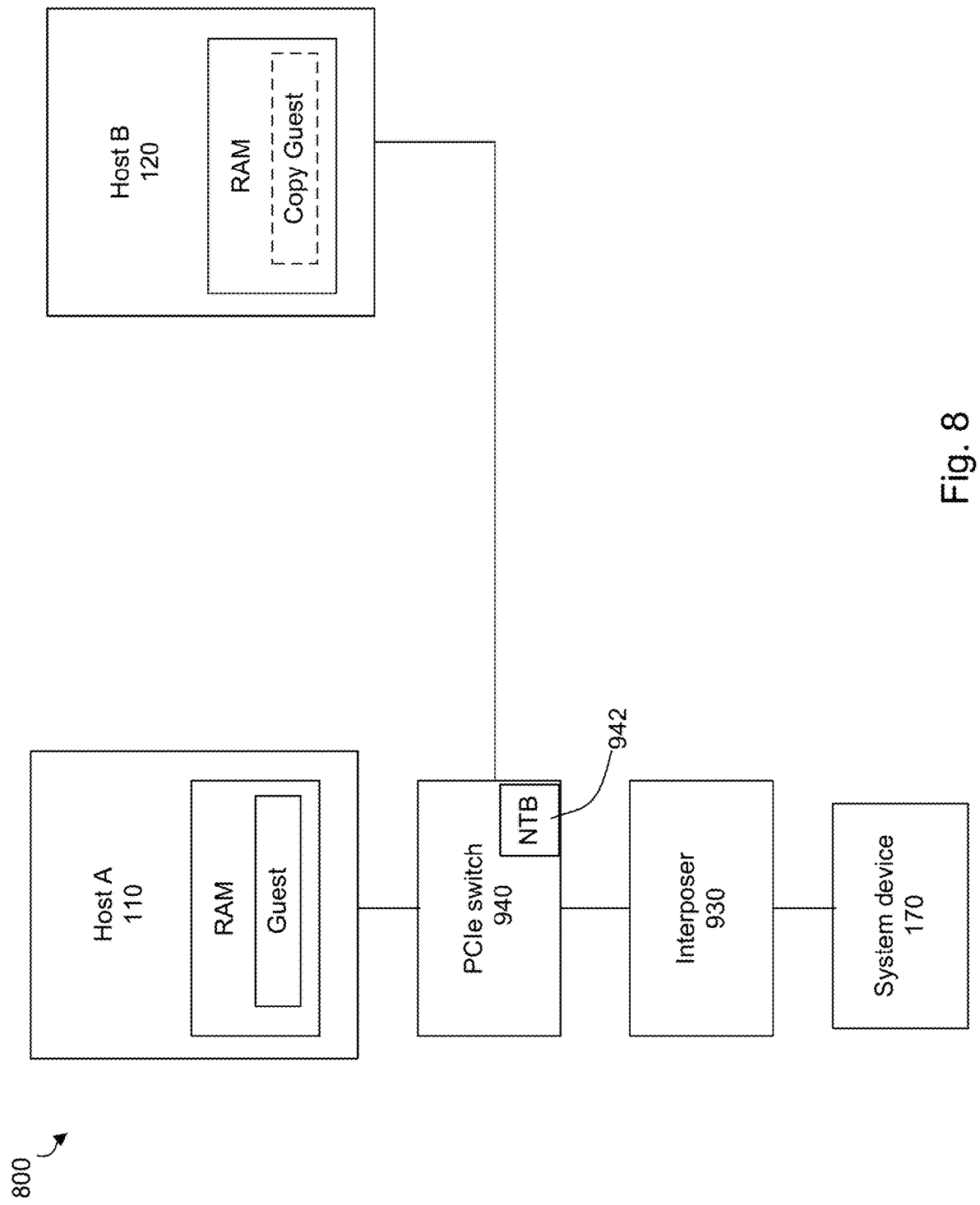
FIG. 8 is a schematic diagram of another example computer system coupling a first host device to a second host device using at least one interposer and an NTB according to aspects of the disclosure.

FIG. 8 illustrates yet another example system 800. In this example, interposer 930 is positioned between NTB 942 of PCIe switch 940 and the Host B 120. This requires less functions of the interposer 930, as compared for example to the interposer 730 of FIG. 7A. In this example 800, the interposer 930 just needs to adjust addresses emitted by system device 170. The NTB 942 can be leveraged to avoid rebuilding some mechanisms, such as.

Figure 9:
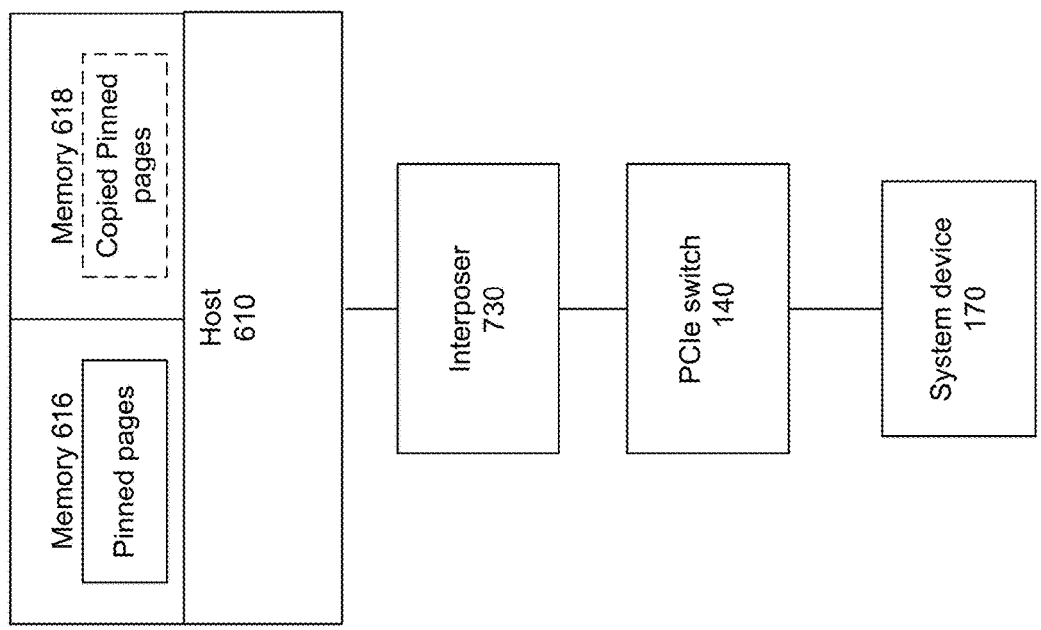
FIG. 9 is a schematic diagram of another example computer system for moving pinned pages within memory locations of a single host device according to aspects of the disclosure.

FIG. 9 illustrates another example system including a single host 610, similar to that described above in connection with FIG. 6. In this example, the pinned pages are again being moved from the first memory 616 to the second memory 618. However, in this example, interposer 740 is used to facilitate the move, and functions similarly to the description above in connection with FIG. 7A.

Figure 10:
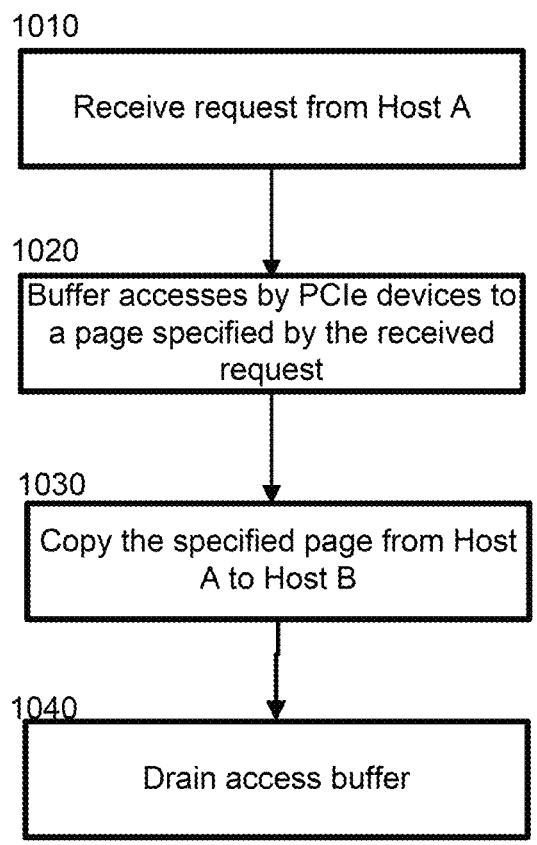
FIG. 10 is a flow diagram of another example method of live migration of a guest having at least one attached peripheral device according to aspects of the disclosure.

FIG. 10 illustrates an example method 1000 of performing migration of the guest 1114 using the interposer of any of the example systems described above.

In block 1010, the interposer receives a request from the Host A. The request may specify a particular page to be copied from the Host A to Host B.

In block 1020, the interposer may buffer accesses by PCIe devices to the specified page. In this regard, the interposer may delay PCIe device access.

In block 1030, the interposer copies the specified page from the Host A to the Host B. Once copying is complete, in block 1040, the interposer drains the buffer of PCIe device accesses.

Figure 11:
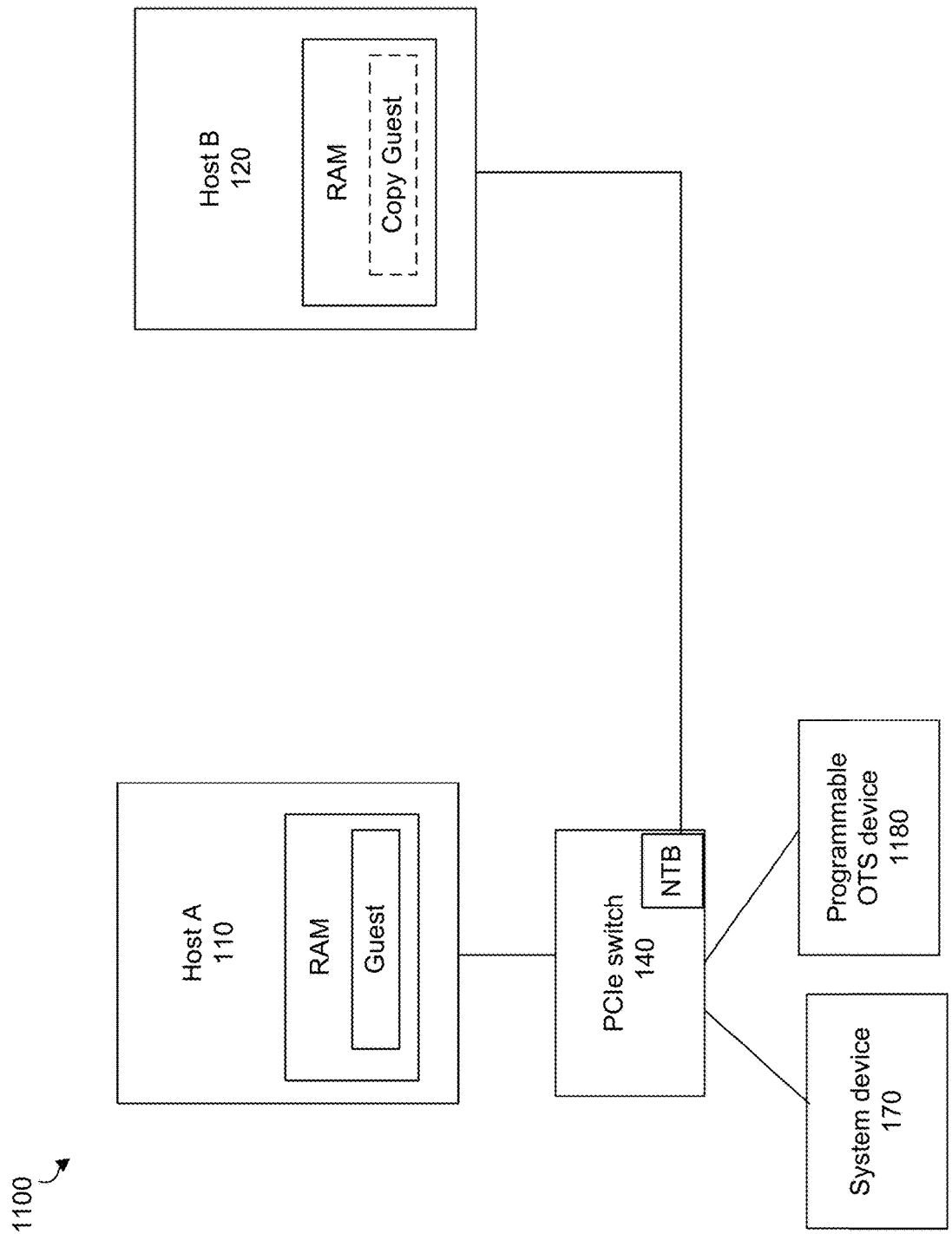
FIG. 11 is a schematic diagram of an example computer system including at least one on-the-side (OTS) programmable device according to aspects of the disclosure.
Figure 12:
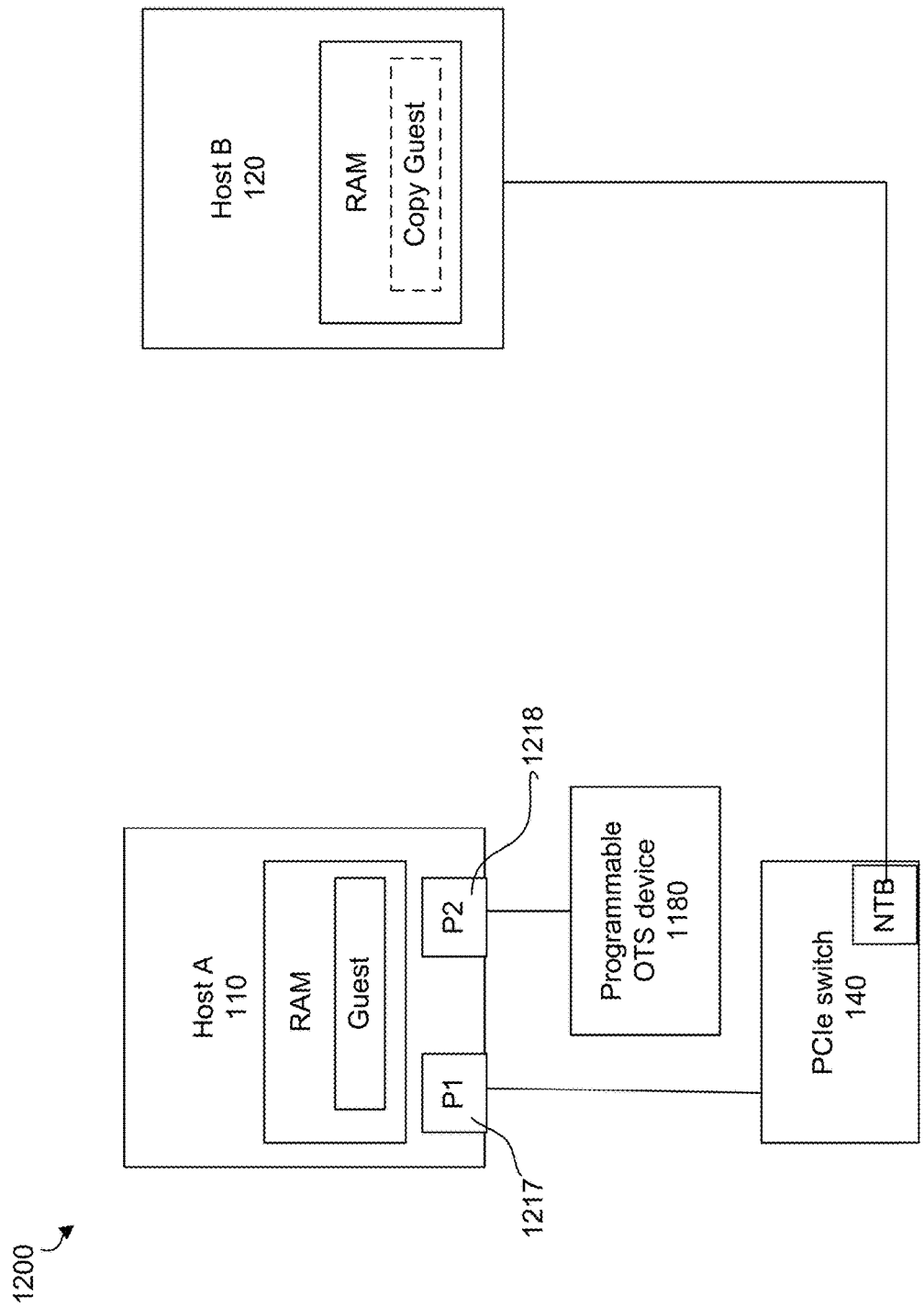
FIG. 12 is a schematic diagram of another example computer system including an OTS programmable device according to aspects of the disclosure.

FIGS. 11-12 illustrate further example systems 1100, 1210 for migrating a guest 114 having one or more attached peripheral devices. These example systems 1100, 1200 each implement a PCIe compliant programmable on-the-side (OTS) device 1180, which may not be capable of full x16 dual port traffic, but can be programmed or designed to perform subsets of the operations of the interposers described above. In the example system 1000 of FIG. 10, the OTS programmable device 1180 is placed on the PCIe switch fabric. In the example system, 1100 of FIG. 11, the PCIe switch 140 is coupled to a first PCIe port 1217 of the Host A 110, while the OTS programmable device 1180 is coupled to a second PCIe port 1218 of the Host A 110. In either system, the OTS programmable device 1180 can track dirty bits and enable copying from the Host A 110 to the Host B 120.

Given the IOMMU and NTB address mapping capability, the OTS programmable device 1180 can map a sub range of the Host A 110 address space at any given time. For example, given a 4 KB moving window that maps device traffic through the OTS programmable device 1180, a typical DMA pattern will not concentrate on any one 4 KB page for a long time. Accordingly, the OTS programmable device 1180 can be interposed on the 4 KB range with minimal performance perturbation. The OTS programmable device 1180 can modify or monitor the packets that are directed to it, and then pass the packet on to their final destination.

The OTS programmable device 1180 can track dirty bits for an entire address space. If the IOMMU page table's leaf nodes are placed in the OTS programmable device 1180, then the OTS programmable device 1180 will know when the page table walker performs reads to the page table leaf nodes. While the page table walk may not directly inform the OTS programmable device 1180 of read or write intent, the OTS programmable device 1180 can infer dirty and accessed bits. For example, for each page table entry touched, if it is readable or writeable, then the 4 KB page referenced has been dirtied and accessed. If the page is only readable, then the 4 KB page has been accessed. Dirty bits can be tracked in page table entries themselves, or as described with respect to the interposer 730.

Figure 13:
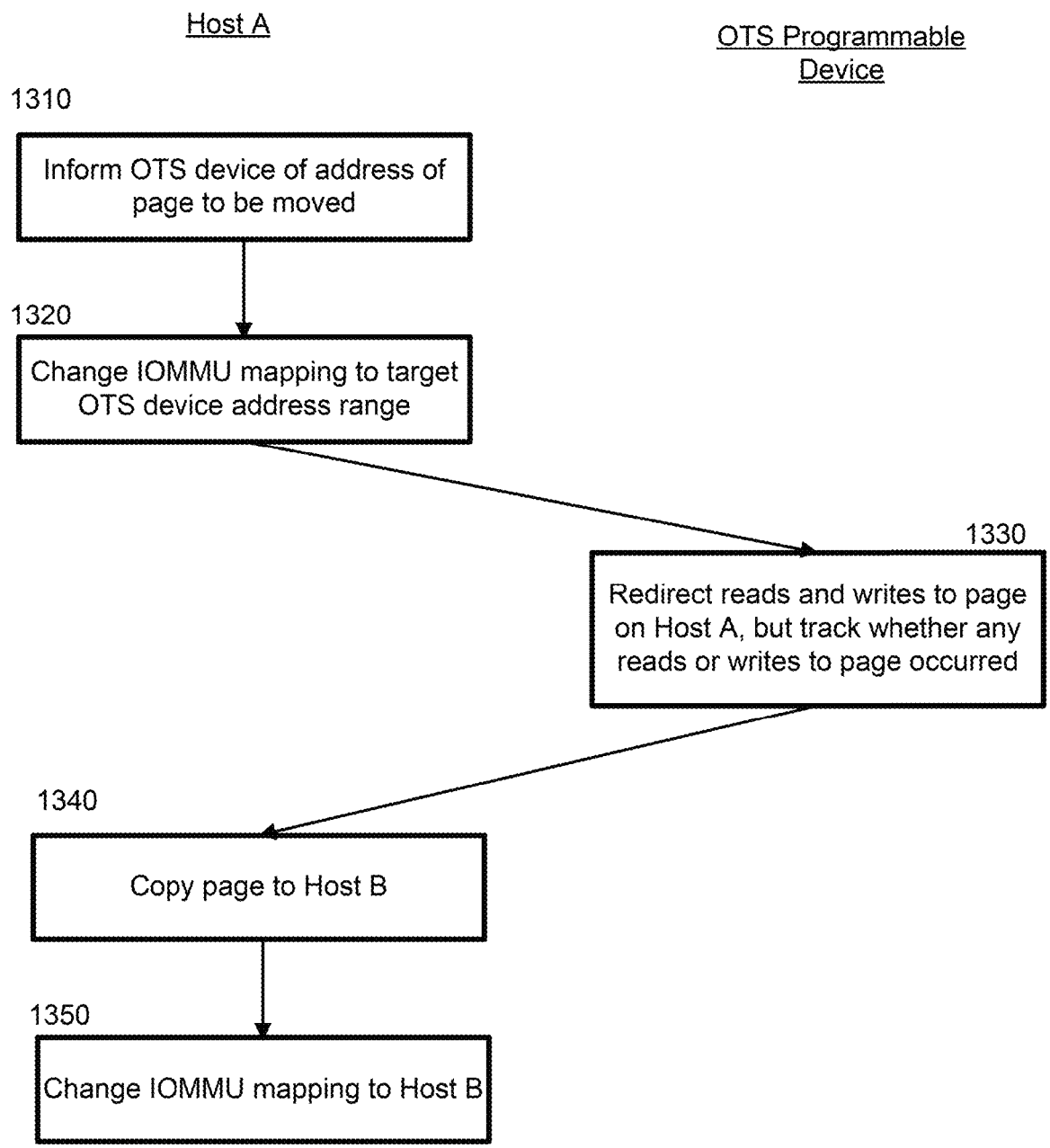
FIG. 13 is a flow diagram of another example method of live migration of a guest having at least one attached peripheral device according to aspects of the disclosure.

A host can redirect a 4 KB page through the OTS programmable device 1180 in order to monitor accesses to the entire 4 KB page. For example, FIG. 13 illustrates an example method 1300 for using the OTS programmable device 1180 to copy a guest from the Host A to the Host B. At a beginning of the method, a page of memory to be moved resides on Host A. The IOMMU of Host A directly targets the page. While a 4 KB page is mentioned in this example, it should be understood that the page may be any size, such as 2 KB, 8 KB, etc.

In block 1310, Host A informs the OTS programmable device of the address of the page on Host A. In block 1320, Host A changes the IOMMU mapping to target the OTS device's address range.

In block 1330, the OTS device redirects reads and write to the page on Host A. The OTS device further tracks if there were any reads or writes to the specified page.

In block 1340, Host A copies the specified page to the Host B. In block 1350, the Host A changes the IOMMU mapping for the copied page to the Host B.

Yet another example system for migration of a guest having attached PCIe devices includes a modified IOMMU. IOMMUs accept commands in registers or command queues. A command is added to the IOMMU asking it to atomically modify. For efficiency, the command queue can be given multiple "modify" commands at once to allow batching of IOMMU TLB invalidations.

A "modify" command may contain information such as a PC1 identifier of the device or devices affected, a domain number, an I/O virtual address (IOVA) whose mapping will be modified, and a destination physical address to change in the IOVA mapping entry. In some examples, rather than including the IOVA whose mapping will be modified, the "modify" command may instead identify the host physical address of the page table entry itself. In this regard, the IOMMU need not walk the page table to find the page table entry to modify. In some examples, the "modify" command may further indicate whether there are subsequent commands in the command queue that affect page table entries sharing the same cacheline. In this example, invalidation and page table entry modification efforts may be batched.

Figure 14:
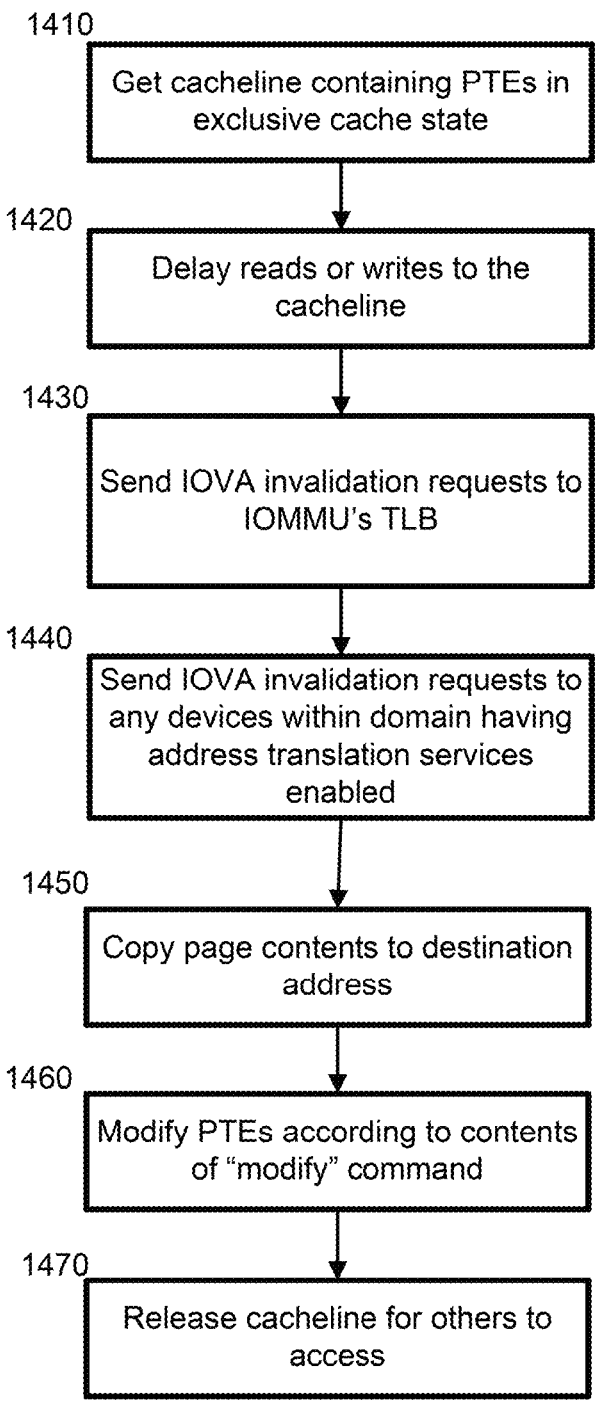
FIG. 14 is a flow diagram of another example method of live migration of a guest having at least one attached peripheral device according to aspects of the disclosure.

FIG. 14 illustrates an example method 1400 performed by the IOMMU when it processes a "modify" command. Similar to the methods above, the operations can be performed in a different order or simultaneously, and operations may be modified, added, or omitted.

In block 1410, the IOMMU gets a cacheline containing the page table entry, or entries, corresponding to the migration in an exclusive cache state.

In block 1420, the IOMMU delays any requests for reads or writes to this cacheline. The delay may be continued until the page table entries are modified according to contents of the "modify" command (block 1460). Any of the IOMMU's own accesses to the cacheline for page table walks are included in this delay. While access to the cacheline is refused, any reads due to page table walks will be delayed. The PCIe fabric contains buffering to hold PCIe requests awaiting service, and the buffers will continue to hold any requests until the IOMMU frees the cacheline for further access. Standard backpressure mechanisms will ensure no packets are lost in the PCIe hierarchy. Performing the sequence rapidly will help to avoid timeouts or performance issues.

In block 1430, the IOMMU sends an IOVA invalidation request to the IOMMU's own TLB. In some examples, new translations for entries invalidated in the IOVA range may be precached. In block 1440, the IOMMU sends an IOVA invalidation request to any devices within the domain having address translation services (ATS) enabled. ATS allows devices to have their own TLBs to cache IOVA to physical translations. ATS requires devices to obey and acknowledge invalidation requests that the IOMMU sends. The IOMMU may further wait for acknowledgements for the requests sent in blocks 1430 and 1440.

In block 1450, the IOMMU copies the page's contents to the destination address.

In block 1460, the IOMMU modifies the page table entry, or entries, according to contents of the "modify" command.

In block 1470, the IOMMU releases the cacheline, providing other devices with access. At this point, reads or writes to the cacheline delayed in block 1420 are no longer delayed.

The method 1400 ensures that no device can use an IOVA mapping during invalidation, page copy, and modification. If that were to occur, the system would be left in an inconsistent state. The method 1400 can be modified for possible optimization to use a mechanism similar to the transactions described above in connection with FIGS. 1-4. For example, instead of delaying (block 1420) any read or write requests to the cacheline of interest, if a request comes in during blocks 1410-1450, then the IOMMU can abort the process without harm. Blocks 1460-1470 may not be aborted, once started, but can complete very quickly. The IOMMU can retry this transaction-like sequence a given number of times. If the transaction-like sequence continues to fail, the IOMMU can perform the method 1400 as shown in FIG. 14, without the optimizations, for guaranteed forward progress.

Yet another system and method for migrating a guest with attached PCIe devices, while preserving atomicity, includes pausing the PCIe devices that are accessing a range of interest. If all PCIe devices access the host via a single bottleneck, it may be possible to leverage that topology to stun multiple devices at once. This may be performed by causing a PCIe link-level resizing or speed retraining event. Some advanced chips may allow this to be done programmatically.

The above described techniques are advantageous in that they provide for increasing a running time of virtual machines with attached peripheral devices that need to be migrated. For example, the techniques described above would increase an uptime of neural net processing machines, which often have many machines ganged together and have little failure tolerance. Further, these techniques can improve post-copy latency for virtual machines with very large memory footprints.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of live migration of a guest virtual machine from a first host to a second host, the method comprising:
   identifying a portion of memory to be copied from the first host to the second host, the portion of memory corresponding to the guest;
   adding the portion of memory into a read set in a first phase of a transaction;
   changing a mapping of the identified portion of memory to identify addresses at the second host;

copying, during a second phase of the transaction, data for the identified portion of memory from the first host to the second host;

invalidating entries at the first host corresponding to the data that was copied; and providing access to the copied data for the identified portion of memory on the second host to one or more external devices.

2. The method of claim 1, wherein changing the mapping comprises updating an input/output memory management unit (IOMMU).

3. The method of claim 1, wherein operations associated with the first phase of the transaction are not visible outside the first host.

4. The method of claim 1, wherein adding the portion of memory to the read set comprises adding all data items to the read set that are read or loaded during the transaction.

5. The method of claim 1, further comprising tracking accesses to cachelines in the read set.

6. The method of claim 5, wherein tracking accesses comprises reading each cacheline.

7. The method of claim 1, further comprising:
detecting writes to the memory portion; and
aborting the transaction when writes are detected.

8. The method of claim 1, further comprising:
caching, in the first phase, a translation of the memory portion; and
invalidating, in the second phase, cached memory portions.

9. The method of claim 1, wherein the first host and the second host communicate timing information prior to beginning a transaction.

10. The method of claim 1, wherein the first host and the second host communicate signals upon completion of the first phase and the second phase.

11. A system for live migration of a guest virtual machine from a first host to a second host, the system comprising:
one or more processors configured to:
identify a portion of memory to be copied from the first host to the second host, the portion of memory corresponding to the guest;
add the portion of memory into a read set in a first phase of a transaction;
change a mapping of the identified portion of memory to identify addresses at the second host;
copy, during a second phase of the transaction, data for the identified portion of memory from the first host to the second host;
invalidate entries at the first host corresponding to the data that was copied; and
provide access to the copied data for the identified portion of memory on the second host to one or more external devices.

12. The system of claim 11, wherein in changing the mapping the one or more processors are configured to update an input/output memory management unit (IOMMU).

13. The system of claim 11, wherein operations associated with the first phase of the transaction are not visible outside the first host.

14. The system of claim 11, wherein in adding the portion of memory to the read set the one or more processors are configured to add all data items to the read set that are read or loaded during the transaction.

15. The system of claim 11, wherein the one or more processors are configured to track accesses to cachelines in the read set.

16. The system of claim 15, wherein in tracking accesses the one or more processors are configured to read each cacheline.

17. The system of claim 11, wherein the one or more processors are configured to:
detect writes to the memory portion; and
abort the transaction when writes are detected.

18. The system of claim 11, the one or more processors are configured to:
cache, in the first phase, a translation of the memory portion; and
invalidate, in the second phase, cached memory portions.

19. The system of claim 11, wherein the first host and the second host communicate timing information prior to beginning a transaction.

20. The system of claim 11, wherein the first host and the second host communicate signals upon completion of the first phase and the second phase.

* * * * *